United States Patent [19]

Isozaki

[11] Patent Number: 5,634,164
[45] Date of Patent: May 27, 1997

[54] LENS-FITTED PHOTOGRAPHIC FILM UNIT SHAPED TO COMPENSATE FOR JACKET EXPANSION

[75] Inventor: Makoto Isozaki, Tokyo, Japan

[73] Assignee: Fuji Photo Film Co., Ltd., Kanagawa, Japan

[21] Appl. No.: 527,843

[22] Filed: Sep. 13, 1995

[30] Foreign Application Priority Data

Sep. 19, 1994 [JP] Japan ................................ 6-223626
Oct. 14, 1994 [JP] Japan ................................ 6-249533

[51] Int. Cl.$^6$ ............................................. G03B 17/02
[52] U.S. Cl. ............................................. 396/535
[58] Field of Search ............ 354/288, 64; 396/535, 396/540, 25, 27, 29

[56] References Cited

U.S. PATENT DOCUMENTS

| | | | |
|---|---|---|---|
| D. 344,532 | 2/1994 | Takiguchi et al. | D16/208 |
| 5,005,035 | 4/1991 | Pagano | 354/206 |
| 5,159,366 | 10/1992 | Gell, Jr. | 354/64 |
| 5,285,228 | 2/1994 | VanDeMoore | 354/219 |
| 5,325,139 | 6/1994 | Matsumoto | 354/64 |
| 5,339,124 | 8/1994 | Harms | 354/64 |
| 5,381,200 | 1/1995 | Takagai | 354/250 |
| 5,506,646 | 4/1996 | Dunsmore et al. | 354/149.11 |
| 5,537,176 | 7/1996 | Hara et al. | 354/288 |
| 5,543,876 | 8/1996 | Suzuki et al. | 354/149.11 |
| 5,557,356 | 9/1996 | Ishida et al. | 354/149.11 |

FOREIGN PATENT DOCUMENTS 6-6348  2/1994  Japan .

*Primary Examiner*—Safet Metjahic
*Assistant Examiner*—Christopher E. Mahoney
*Attorney, Agent, or Firm*—Young & Thompson

[57] ABSTRACT

In a film unit, a front surface of a unit body is made convex so as to corresponds to a curve of possible swelling of a substantially rectangular outer case so that the outer case, which is formed by folding along straight lines, is kept in tight contact with the unit body. For a unit body having a grip on one side of a front surface thereof, two curved folding lines are provided on a front wall of an outer case along a portion corresponding to a step to the front surface to the grip of the unit body. The curved folding lines are folded in opposite directions to each other to form a step in accordance with the step between the grip and the front surface.

12 Claims, 8 Drawing Sheets

LENS-FITTED PHOTOGRAPHIC FILM UNIT SHAPED TO COMPENSATE FOR JACKET EXPANSION

BACKGROUND OF THE INVENTION

1. Field of the Invention

The present invention relates to a lens-fitted photographic film unit, wherein a unit body containing a roll of photographic film has a taking lens and an exposure mechanism incorporated therein and is encased in an outer case which is formed by folding a sheet material.

2. Background Art

Lens-fitted photographic film units, hereinafter referred to as film units, have been known as a kind of single-use preloaded camera which is affordable for everyone and permits enjoying photography with ease.

In view of the above use, the film units must not be expensive. To make the appearance attractive at a low cost, the body of the film unit is wrapped or encased in an outer case having an ornamental pattern printed thereon. The ornamental pattern further serves to distinguish the film unit from other types of film units. The outer case also has information about the film unit such as the type of the preloaded photographic film, the type of the taking lens, the format of the picture frame, and instructions how to use the film unit. Moreover, the outer case prevents dust from setting on the unit body or entering inside the unit body. The outer cases are mostly made of cardboard and are formed by folding and sticking a blanked sheet of cardboard into a box.

However, due to resiliency of the cardboard, the folded portions of the outer case have a tendency to unfold so the outer case tends to bulge or swell, especially when it has open sides or many or large openings. In case being made of cardboard, the outer case may expands and swell out due to moisture-absorption.

The bulged outer case spoils the appearance of the film unit, and cannot sufficiently protect the unit body from dust. Where the outer case covers some operational members of the film unit such as a flash charge button or a grip, the loosened or swelled outer case can impair smoothness in operation.

To solve the above problem, a rectangular outer case of the film unit has been suggested in JPB 6-6348, of which a front side is formed as an outwardly concave and inwardly convex surface so that the front wall and thus rear wall are kept in contact with the unit housing even when the outer case is somewhat unfolded or loosened. To form the curved surface in one side of the outer case, the cardboard is folded along a pair of curved lines which define opposite margins of the curved surface.

However, it is difficult to fold along the curved lines and to form thereafter a substantially rectangular box. A complicated and accurate assembling machine is needed for automatic forming of such outer cases having curved sides.

There have been suggested film units having a grip portion which protrudes forward from the front surface of the unit body. Because of the difference in thickness between the grip and the front surface, the outer case of such a film unit tends to lose contact with the border portion between the front surface and the grip, which will make holding of the film unit unsteady.

OBJECT OF THE INVENTION

A primary object of the present invention is to provide a film unit wherein an outer case formed by folding is kept in tight contact with a unit body, without the need for any complicated assembling process of the outer case.

Another object of the present invention is to provide an outer case of a film unit, which fits on a unit body having a protruding grip portion, on all sides thereof.

SUMMARY OF THE INVENTION

To achieve the above and other objects, the present invention curves at least a wall of a unit body so as to correspond to a curve of possible swelling of an outer case.

Thus, an outer case formed by folding along straight lines is kept in tight contact with the unit body.

For a film unit having a grip which protrudes forwardly from a front surface of a unit body, the present invention provides two curved folding lines on a front wall of an outer case along a portion corresponding to a step or border zone of the front surface of the unit body to the grip. The curved folding lines are folded in opposite directions to each other to form a step in accordance with the step between the grip and the front wall of the unit body.

BRIEF DESCRIPTION OF THE DRAWINGS

Other objects and advantages of the present invention will become apparent from the following detailed description of the preferred embodiments when read in connection with the accompanying drawings, wherein like reference numerals designate like or corresponding parts throughout the several views, and wherein.

DETAILED DESCRIPTION OF THE PREFERRED EMBODIMENTS

Figure 1:
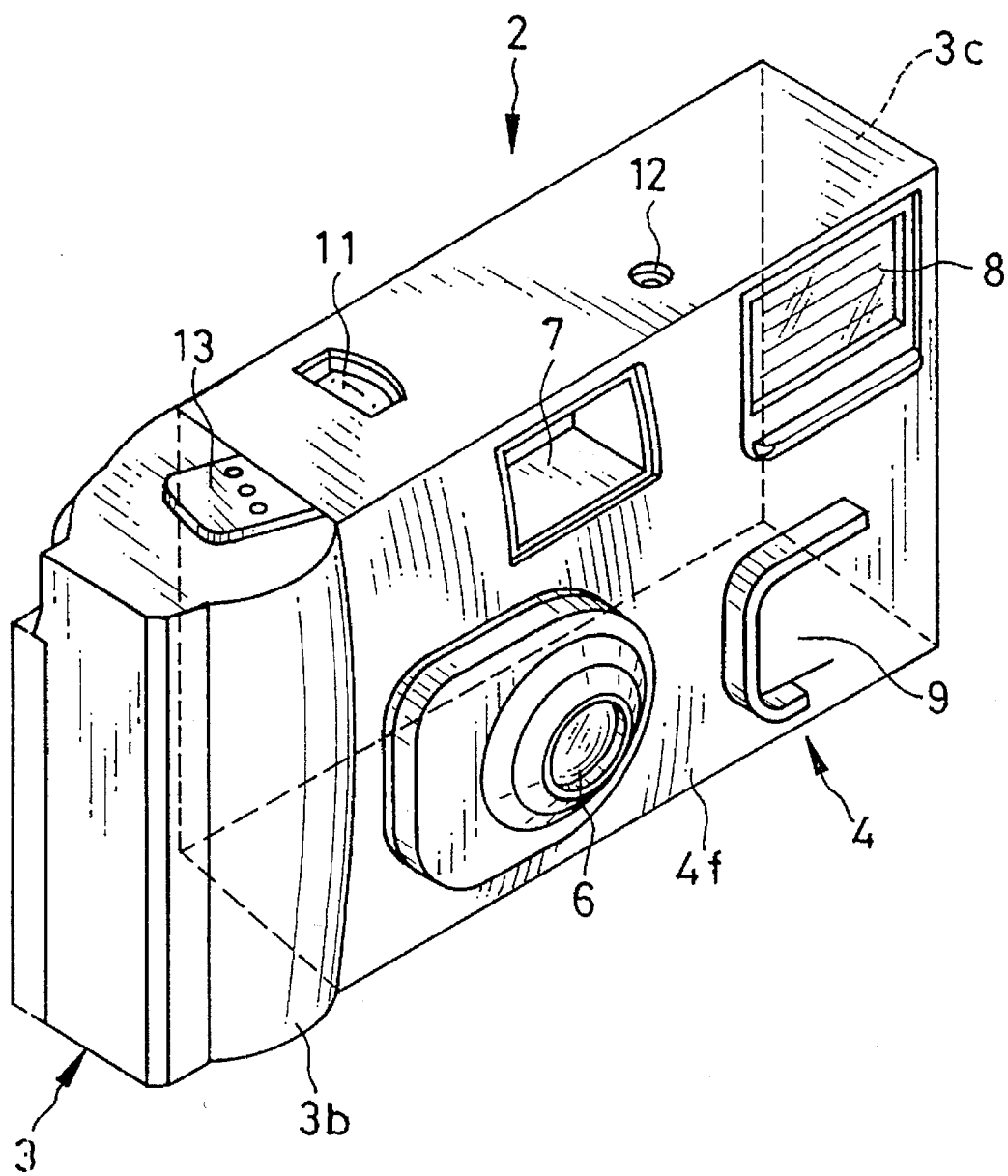
FIG. 1 is a perspective view of a film unit according to a first embodiment of the invention.
Figure 2:
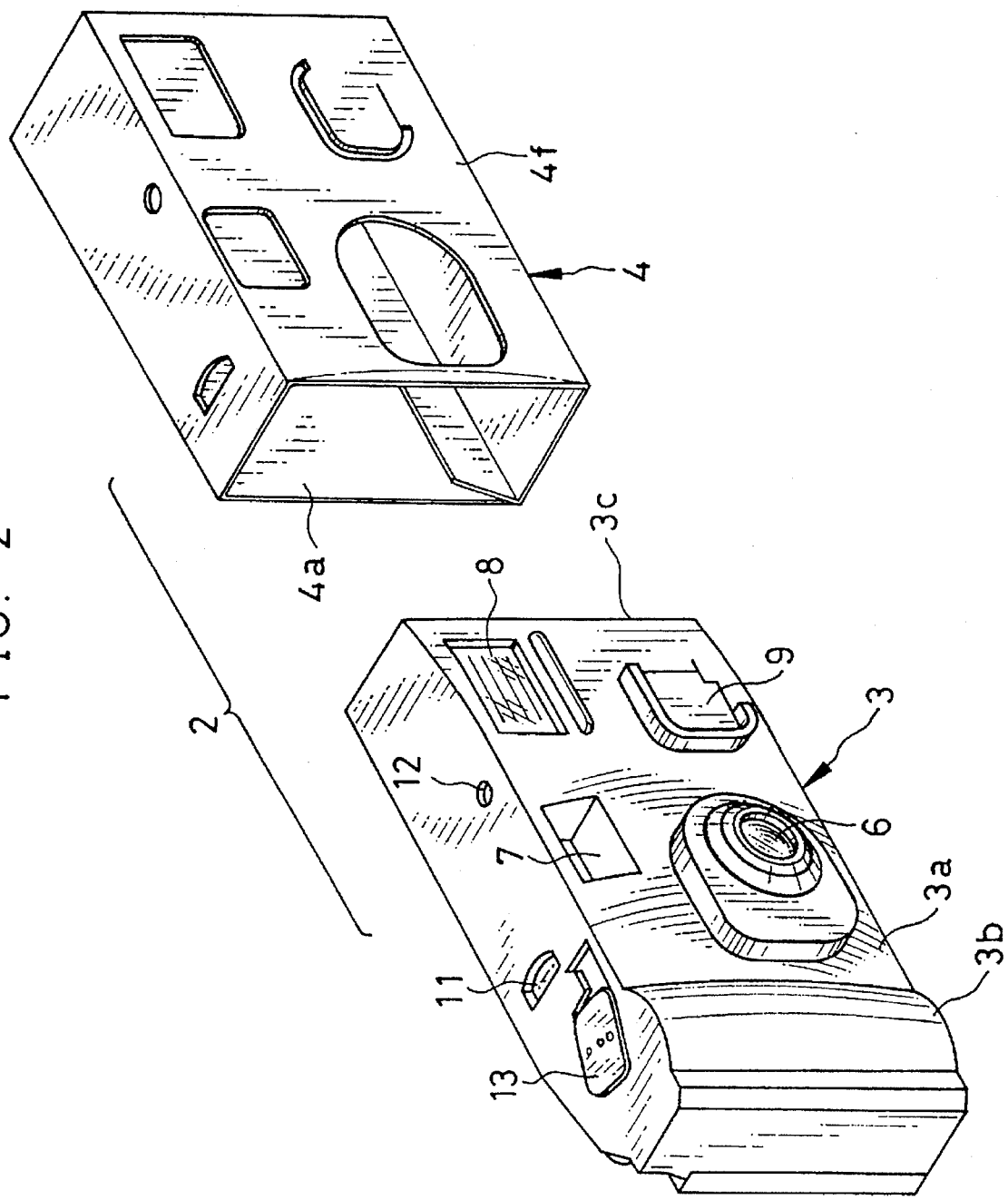
FIG. 2 is a an exploded view of a unit body and an outer case of the first embodiment.

FIG. 1 shows a film unit according to a preferred embodiment of the invention. The film unit 2 is constituted of a unit body 3 and an outer case 4 encasing the unit body 3 therein, as shown in FIG. 2. The case 4 has an open side 4a.

The unit body 3 contains a roll of unexposed photographic film (not-shown) therein. A taking lens 6, a viewfinder 7, a flash window 8, a flash charge button 9, a frame counter 11, an indication lamp 12 for indicating the completion of charging and a shutter release button 13 are provided in the unit body 3. The outer case 4 has openings or cut-outs for exposing the above photographic elements of the unit body 3 to the outside.

Figure 3:
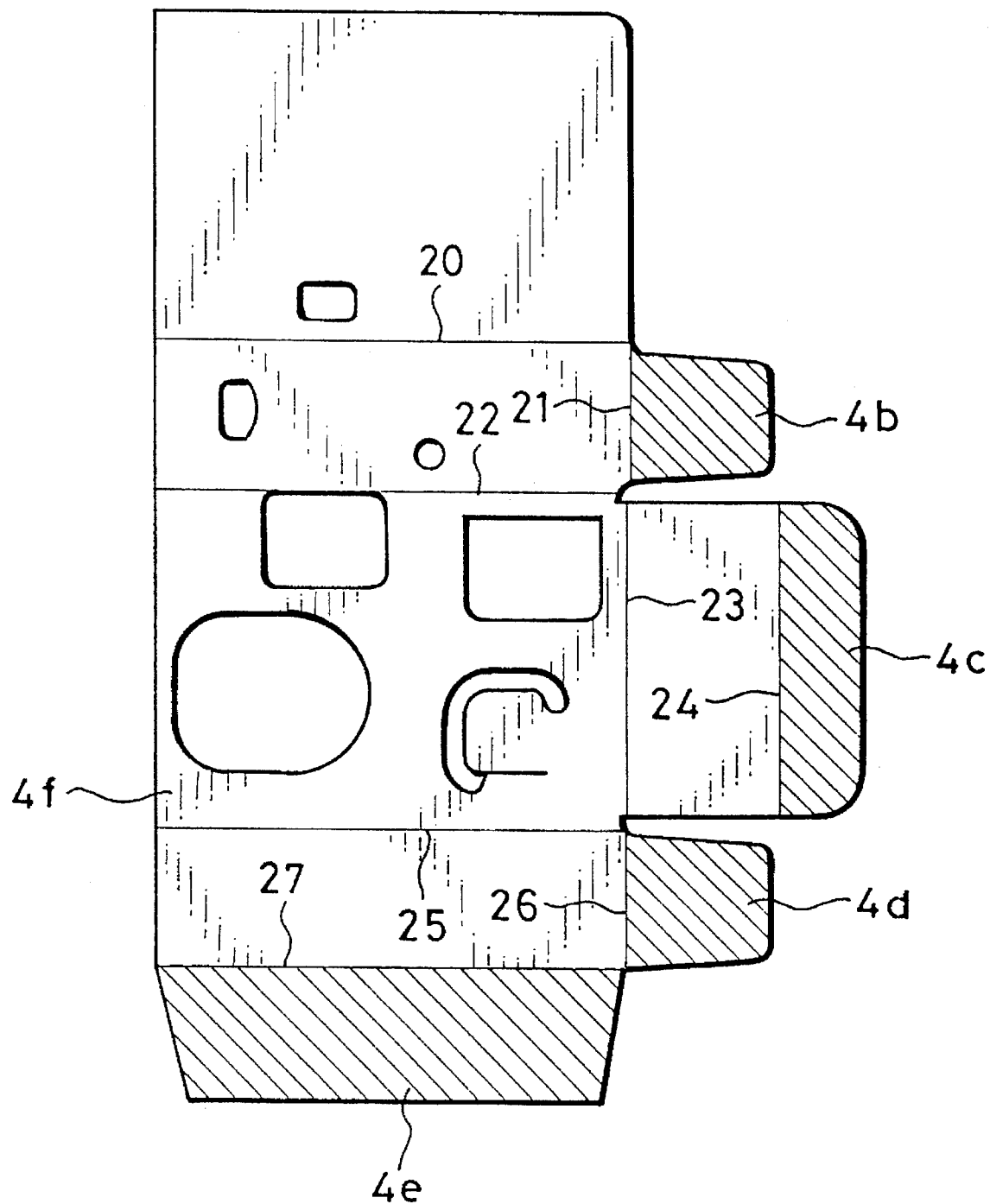
FIG. 3 is a flattened or unfolded view of the outer case of the first embodiment.

As shown in FIG. 3, the outer case 4 is made of a blanked sheet, e.g., cardboard or plastic sheet. The sheet has information and decorative patterns printed thereon, and is folded along straight lines 20, 21, 22, 23, 24, 25, 26 and 27 into a rectangular box having the open side 4a. Then, flaps or pasting margins 4b, 4c, 4d and 4e are cemented appropriately. The unit body 3 may be inserted into the outer case 4 through the open side 4a. Due to resiliency of the sheet material, the outer case 4 tends to swell or bulge out especially because it has the open side 4a, as is implied by a phantom line in FIG. 2.

Figure 4:
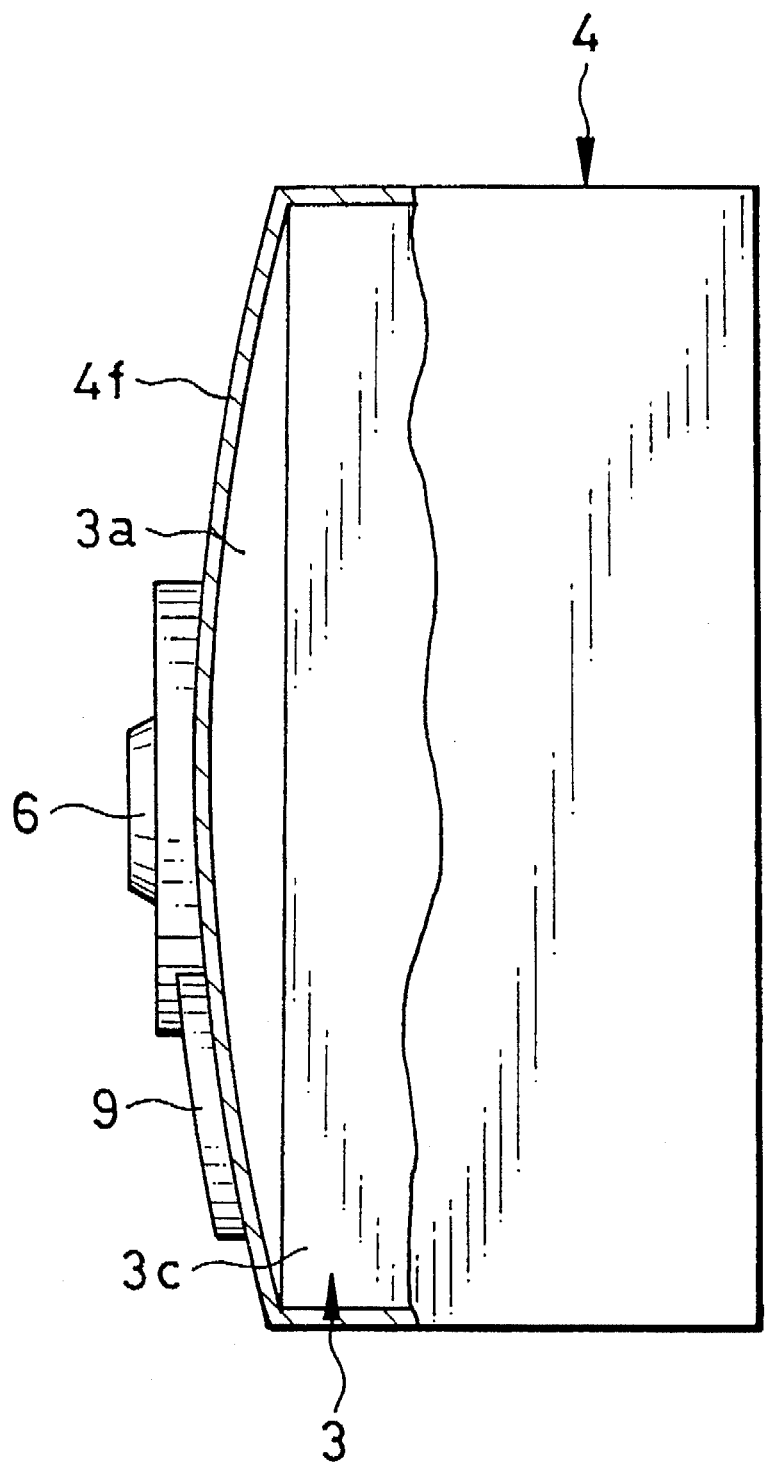
FIG. 4 is a side view, partly in section, of the film unit of the first embodiment.

As shown in FIG. 4, the unit body 3 has a front surface or wall 3a which is curved to be forwardly convex, and a grip 3b is formed on the left side of the front surface 3a in FIG. 2. The grip 3b protrudes forward from the front surface 3a. In this embodiment, the outer case 4 does not cover the grip 3b.

As is seen in FIGS. 1, 2, 5 and 6, the front surface 3a of the unit body 3 is convex both from top to bottom and from side to side, such that the front surface 3a always fits with a front wall 4f of the outer case 4 even when the outer case 4 swells out. It is preferable thus to curve the front surface 3a in both horizontal and vertical directions in correspondence with the possible swelling of the front wall 4f.

The sheet material of the outer case 4 must be flexible enough to permit folding into a box. Thanks to the flexibility of the outer case 4, the unit body 3 with the convex front surface 3a can be fitted into the originally rectangular outer case 4 through its open side 4a, with a right side 3c of the unit body 3 in the lead. However, it is of course possible to wrap the exploded outer case 4 around the unit body 3 before sticking at the flaps 4b to 4e.

Figure 5:
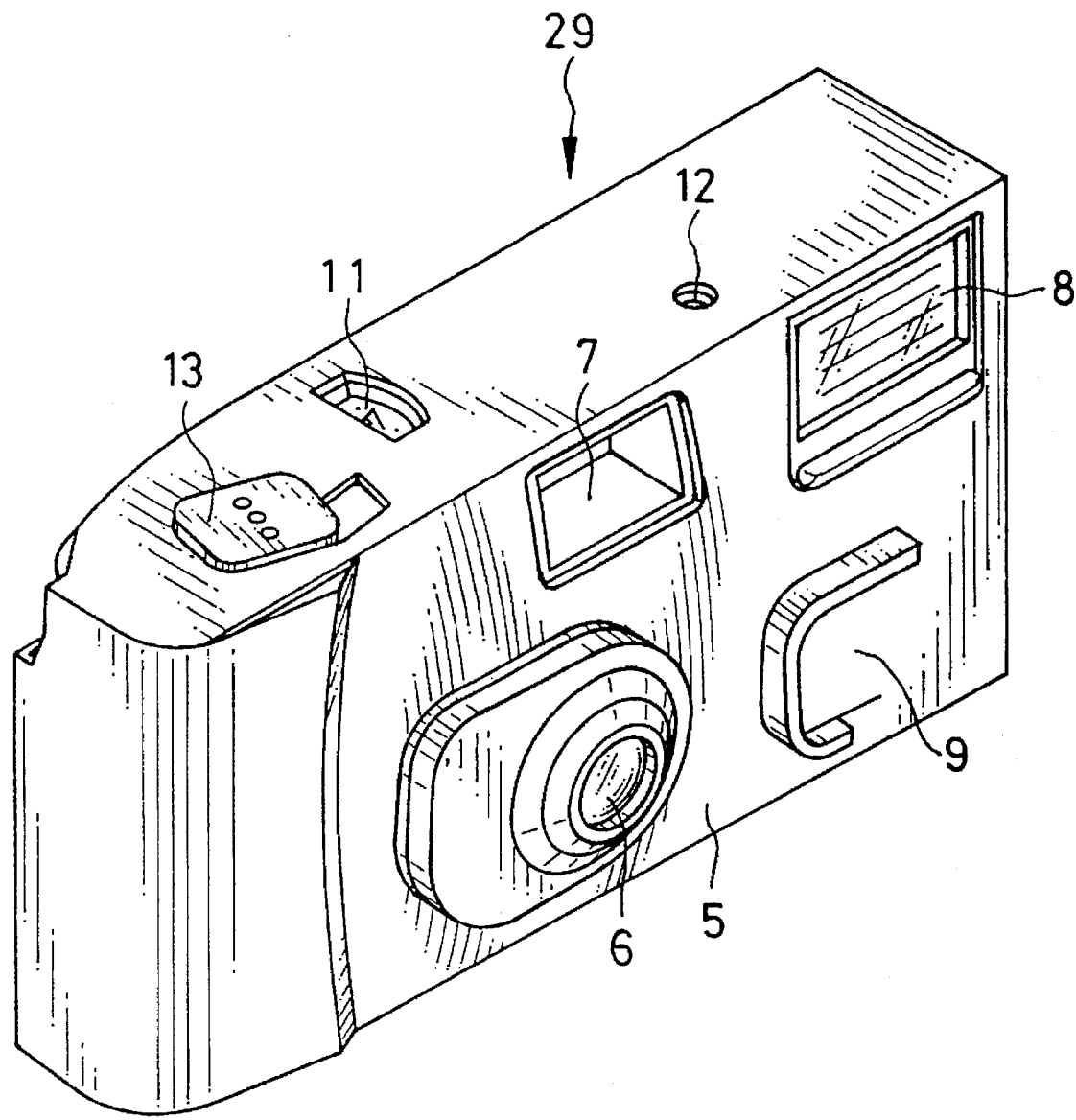
FIG. 5 is a perspective view of a film unit according to a second embodiment of the invention.
Figure 6:
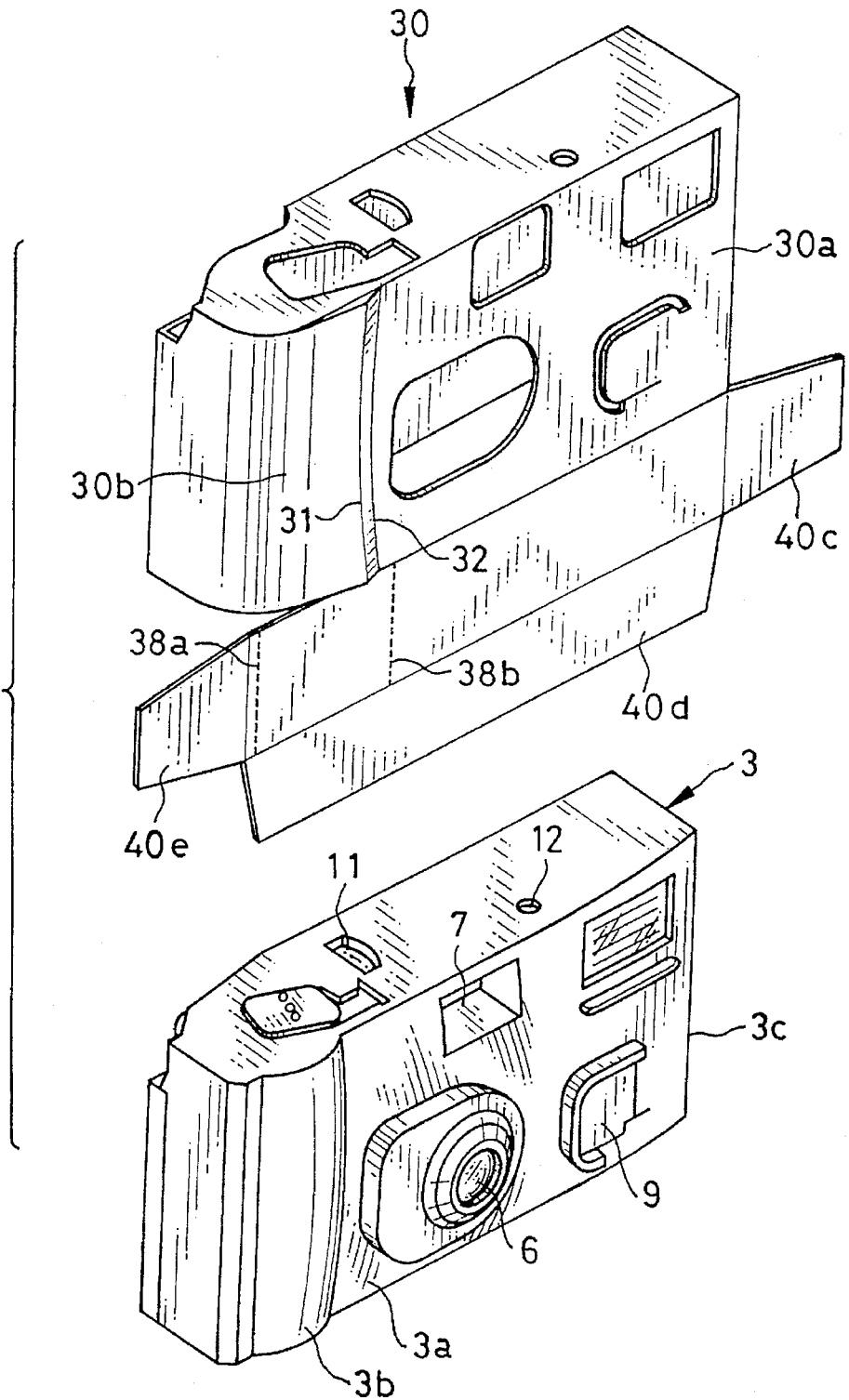
FIG. 6 is an exploded view of a unit body and an outer case of the second embodiment.

FIG. 5 shows a film unit 29 according to another embodiment of the invention, wherein an outer case 30 covers all sides of a basically rectangular unit body 3 inclusive of a grip 3b. A front surface 3a of the unit body 3 is gently convex in both horizontal and vertical directions and the grip 3b protrudes forwardly from the front surface 3a, as in the first embodiment. The unit body 3 may have the same construction as that of the first embodiment. Therefore, like elements are designated by the same reference numerals, so that the description thereof may be omitted.

Figure 7:
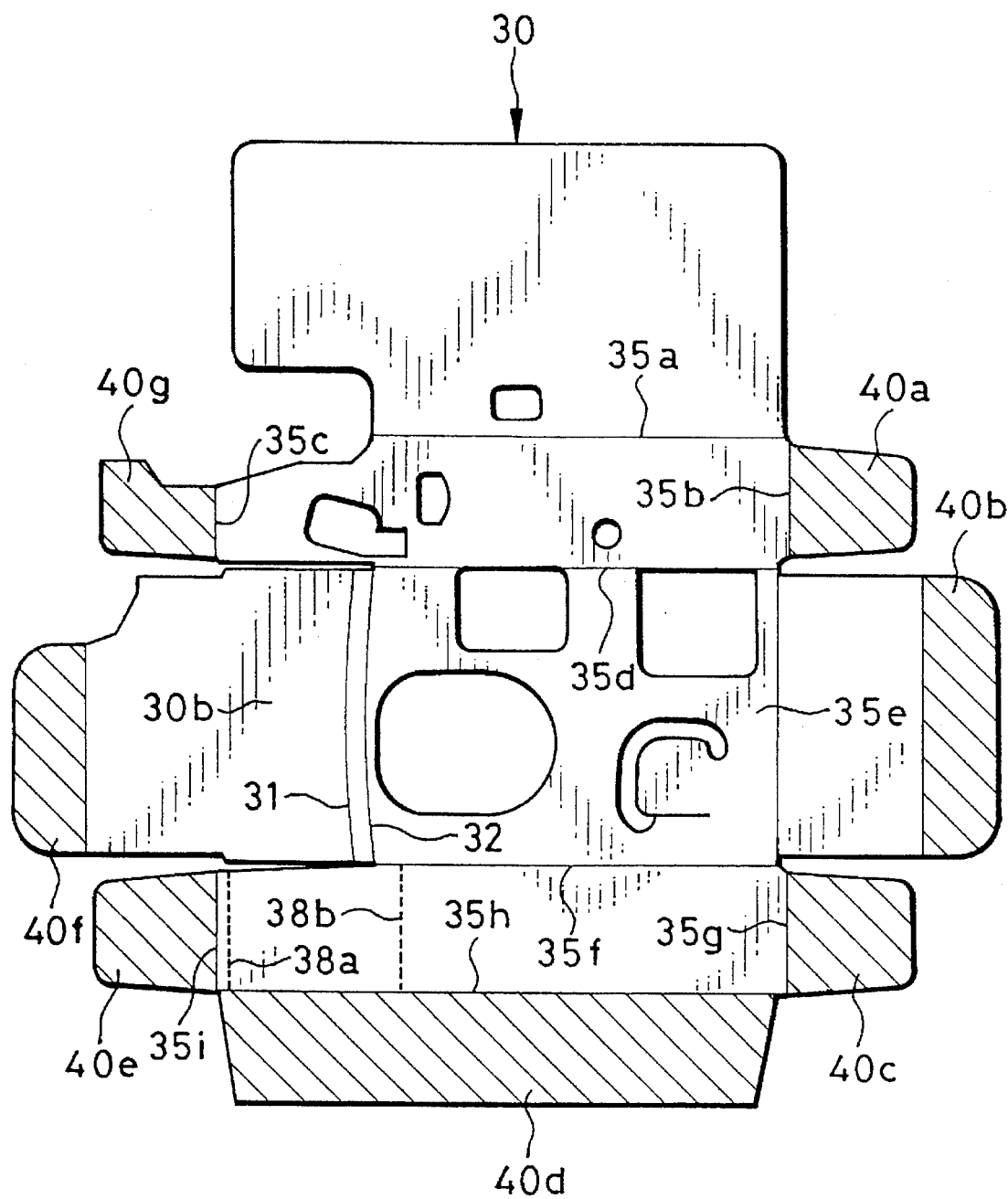
FIG. 7 is a flattened or unfolded view of the outer case of the second embodiment.

The outer case 30 is made of a blanked sheet, e.g., cardboard, as shown in FIG. 7. The sheet is folded and stuck at together into a substantially rectangular box. In a front wall 30a of the outer case 30, there are two arc-shaped folding lines 31 and 32 having an equal curvature. The lines 31 and 32 are folded in opposite directions to each other to form a step, such that a grip cover section 30b on the left side of the step in FIG. 6 protrudes forwardly from the other area of the front wall 30a.

The curvature of the lines 31 and 32 is determined such that the front wall 30a of the outer case 30 will tightly fit on the convex front surface 3a of the unit body 3. Because of the step formed by folding the lines 31 and 32, the outer case 30 does not lose contact with the unit body 3 even in the border to the grip 3b. Therefore, also the grip cover section 30b fits on the grip 3b to permit secure holding of the film unit 29.

To encase the unit body 3 in the outer case 30, first the lines 31 and 32 are folded in the above-described fashion, and then the unit body 3 is put on the outer case 4 flattened as a sheet, so as to adjust the respective elements to the corresponding openings of the outer case 30. The sheet is folded along lines 35a, 35b, 35c, 35d, 35e, 35f, 35g, 35h and 35i to wrap the unit body 3, and is glued flaps 40a, 40b, 40c, 40d, 40e, 40f and 40g complete the box.

Dashed lines 38a and 38b represent perforations for easy tearing of the outer case 30 at the bottom of a cassette chamber which is disposed behind the grip 3b. The cassette chamber is openable at its bottom side for removal of a film cassette containing a roll of exposed photographic film.

Figure 8:
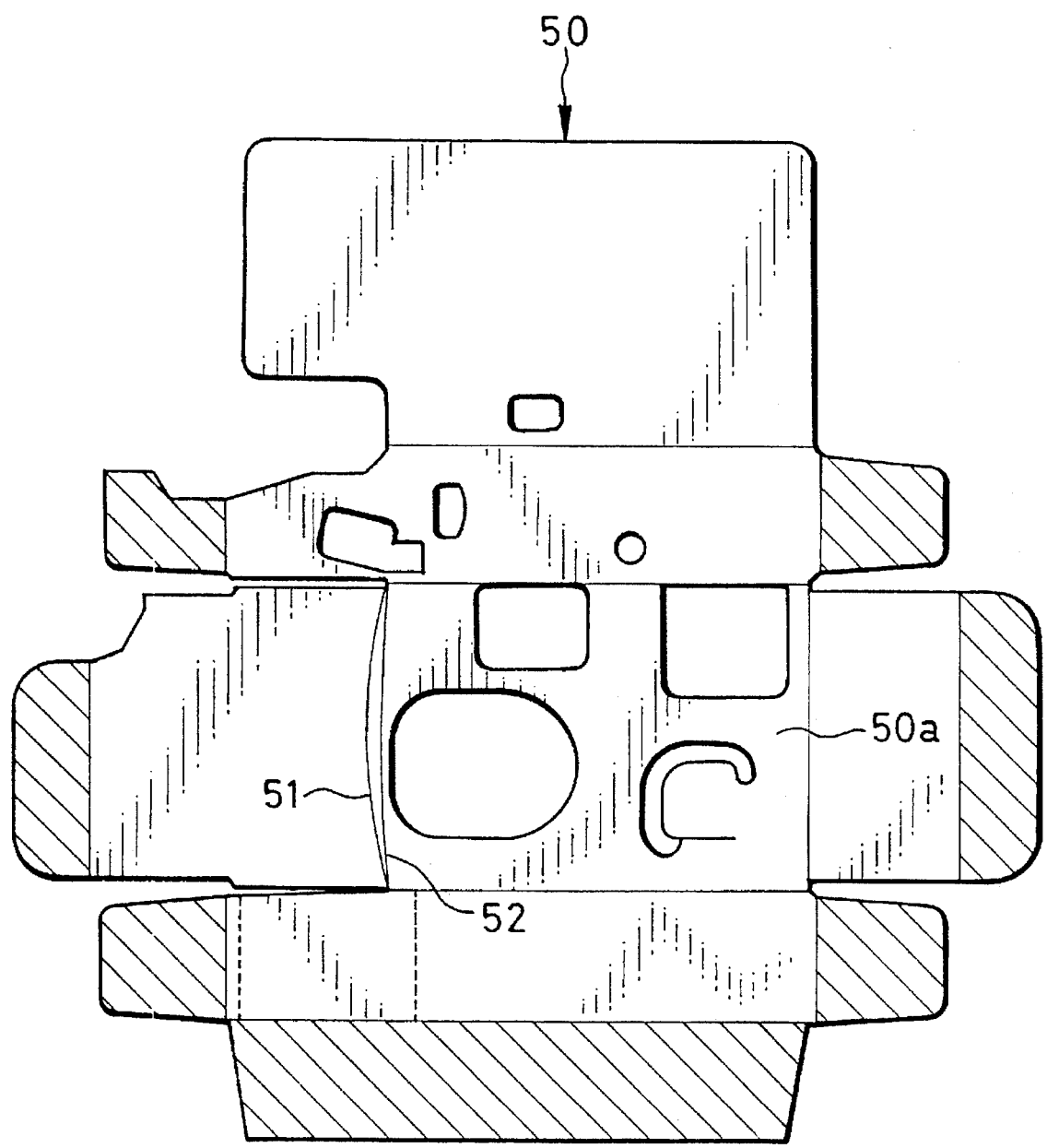
FIG. 8 is a flattened or unfolded view of an outer case according to a third embodiment of the invention.

According to a further preferred embodiment shown in FIG. 8, arc-shaped folding lines 51 and 52 having different curvatures are provided for forming a step in a front wall 50a of an outer case 50, instead of the folding lines 31 and 32 having the same curvature. The curvature of the line 52 nearer to the center of the front wall 50a is preferably determined in accordance with the curve of the convex front surface 3a of the unit body 3.

As described so far, according to the invention, the outer case always tightly contacts the unit body. Therefore, the film unit is improved in appearance and handling. Also, dust or the like cannot easily enter between the outer case and the unit body.

It is possible to curve other sides of the unit body than the front to be convex, and assemble the outer case such that the corresponding wall of the outer case can curve correspondingly.

Although the present invention has been described with respect to the preferred embodiment shown in the drawings, the present invention is not limited to the above-described embodiments, but on the contrary, various modifications may be possible without departing from the scope of the appended claims.

What is claimed is:

1. A lens-fitted photographic film unit comprising:
   a unit body loaded with a roll of photographic film and equipped with a taking lens and an exposure mechanism;
   a grip formed on a front side of said unit body;
   an outer case of folded sheet material wrapping said unit body therein except said grip, and having a hole for exposing said taking lens to the outside; and
   a convex front surface of said unit body formed adjacent to said grip, said convex front surface being curved in two orthogonal directions, said taking lens being disposed on the peak area of said convex front surface, so as to keep said outer case in contact with said unit body when said outer case swells out.

2. A lens-fitted photographic film unit as claimed in claim 1, wherein said outer case has openings formed therethrough to expose operational elements of said exposure mechanism to the outside to permit photography without the need for removal of said outer case.

3. A lens-fitted photographic film unit as claimed in claim 1, wherein said outer case has at least an open side.

4. A lens-fitted photographic film unit as claimed in claim 1, wherein said folded sheet material is cardboard.

5. A lens-fitted photographic film unit comprising:
   a unit body having front, rear, top, bottom, right and left sides, and being loaded with a roll of photographic film and equipped with a taking lens and an exposure mechanism;
   a convex front surface formed on said front side of said unit body, said convex front surface being curved in a first direction from said top side to said bottom side of said unit body and in a second direction orthogonal to said first direction, said taking lens being disposed on the peak area of said convex surface;
   A grip formed adjacent to said convex front surface, said grip extending in said first direction and protruding forwardly from said convex front surface;
   an outer case of folded sheet material wrapping said unit body therein, and having a hole for exposing said taking lens to the outside; and a step formed in a front wall of said outer case along a portion corresponding to a step between said front surface of said unit body and said grip, said step of said front wall of said outer case being defined by folds in said front wall along a pair of curved lines, said folds opening in opposite directions to each other such that said front wall fits on said convex front surface and said grip.

6. A lens-fitted photographic film unit as claimed in claim 5, wherein said curved lines are parallel with each other.

7. A lens-fitted photographic film unit as claimed in claim 5, wherein said curved lines have different curvatures.

8. A lens-fitted photographic film unit as claimed in claim 7, wherein said curved lines connect to each other at ends thereof.

9. A lens-fitted photographic film unit as claimed in claim 5, wherein said folded sheet material is cardboard.

10. A lens-fitted photographic film unit comprising:

a unit body having front, rear, top, bottom, right and left sides, and being loaded with a roll of photographic film and equipped with a taking lens and an exposure mechanism;

a convex front surface formed on said front side of said unit body, said convex front surface being curved in a first direction from said top side to said bottom side of said unit body and in a second direction orthogonal to said first direction, said taking lens being disposed on the peak area of said convex front surface;

A grip formed adjacent to said convex front surface, said grip extending in said first direction and protruding forwardly from said convex front surface;

an outer case of sheet material wrapping said unit body therein, and having a hole for exposing said taking lens to the outside; and a step formed in a front wall of said outer case along a portion corresponding to a step of said front surface of said unit body to said grip, said step of said front wall of said outer case being defined by a fold in said front wall along a curved line such that said front wall fits on said convex front surface and said grip.

11. A lens-fitted photographic film unit as claimed in claim 10, wherein said outer case has openings formed therethrough to expose operational elements of said exposure mechanism to the outside to permit photography without the need for removal of said outer case.

12. A lens-fitted photographic film unit as claimed in claim 11, wherein said front wall is partly separated from top and bottom wall portions of said outer case so as to permit folding said front wall to form said step.

* * * * *